(12) United States Patent
Lo et al.

(10) Patent No.: US 9,075,876 B2
(45) Date of Patent: Jul. 7, 2015

(54) SEARCH METHOD FOR VIDEO CLIP

(71) Applicant: NATIONAL APPLIED RESEARCH LABORATORIES, Hsinchu (TW)

(72) Inventors: Shi-Wei Lo, Taoyuan County (TW); Fang-Pang Lin, Taoyuan County (TW)

(73) Assignee: National Applied Research Laboratories, Hsinchu (TW)

( * ) Notice: Subject to any disclaimer, the term of this patent is extended or adjusted under 35 U.S.C. 154(b) by 410 days.

(21) Appl. No.: 13/709,232

(22) Filed: Dec. 10, 2012

(65) Prior Publication Data
US 2014/0099023 A1   Apr. 10, 2014

(30) Foreign Application Priority Data
Oct. 5, 2012   (TW) .............................. 101137038 A

(51) Int. Cl.
*G06K 9/00* (2006.01)
*G06F 17/30* (2006.01)
(52) U.S. Cl.
CPC ................................ *G06F 17/30802* (2013.01)
(58) Field of Classification Search
None
See application file for complete search history.

(56) References Cited

U.S. PATENT DOCUMENTS

| | | | | |
|---|---|---|---|---|
| 5,870,754 | A * | 2/1999 | Dimitrova et al. | ..................... 1/1 |
| 8,786,785 | B2 * | 7/2014 | Hendrickson et al. | ........ 348/700 |
| 2004/0240562 | A1 * | 12/2004 | Bargeron et al. | ........ 375/240.29 |
| 2008/0239159 | A1 * | 10/2008 | Read et al. | ..................... 348/701 |
| 2010/0049711 | A1 * | 2/2010 | Singh et al. | ....................... 707/6 |

\* cited by examiner

*Primary Examiner* — Phuoc Tran
(74) *Attorney, Agent, or Firm* — Rosenberg, Klein & Lee

(57) ABSTRACT

The present invention provide an automatic, frame-by-frame, rapid, and accurate search method for video clip. It comprises the following steps. First, acquire and store a plurality of videos to a storage unit. Each video comprises a plurality of frames, respectively. Then, a processing unit extracts the characteristics of the plurality of frames and gives a plurality of characteristic values. Next, the processing unit calculates a plurality of difference values between the characteristic value of each frame and that of the previous frame and between the characteristic value of the subsequent frame and that of the current frame. Store a data set, which is produced by corresponding the plurality of difference values between all frames of each video to the time axis, to the storage unit. Finally, the processing unit compares a data set of any video with a plurality of data sets of other videos and gives a search result.

17 Claims, 13 Drawing Sheets

| Similarity | Video-357 | Video-358 | Video-359 | Video-360 | Video-361 |
|---|---|---|---|---|---|
| Video-357 | 0.0 | 19.5 | 20.6 | 38.9 | 7.3 |
| Video-358 | 19.5 | 0.0 | 11.6 | 185.8 | 7.2 |
| Video-359 | 20.6 | 11.6 | 0.0 | 1.6 | 0.2 |
| Video-360 | 38.9 | 185.8 | 1.6 | 0.0 | 0.2 |
| Video-361 | 7.3 | 7.2 | 0.2 | 0.2 | 0.0 |
| Video-362 | 29.7 | 196.1 | 4.3 | 250.9 | 0.3 |
| Video-363 | 34.6 | 16.0 | 3.0 | 132.8 | 1.6 |
| Video-364 | 11.1 | 10.1 | 3.8 | 3.5 | 0.8 |
| Video-365 | 37.5 | 14.2 | 9.0 | 122.3 | 1.5 |
| Video-366 | 38.4 | 11.2 | 1.7 | 1.6 | 1.0 |
| Video-367 | 38.6 | 22.1 | 0.7 | 123.1 | 0.4 |
| Video-368 | 4.7 | 4.8 | 3.6 | 3.1 | 3.5 |
| Video-369 | 8.1 | 8.6 | 9.7 | 9.0 | 9.1 |
| Video-370 | 8.0 | 9.0 | 0.3 | 0.3 | 0.2 |
| Video-371 | 11.3 | 10.6 | 2.7 | 2.1 | 0.8 |
| Video-372 | 37.2 | 111.4 | 2.0 | 249.0 | 0.3 |
| Video-373 | 60.1 | 63.4 | 80.7 | 122.7 | 0.4 |
| Video-374 | 7.9 | 8.9 | 0.3 | 0.3 | 0.2 |
| Video-375 | 38.6 | 47.0 | 0.7 | 134.5 | 0.3 |
| Video-376 | 35.0 | 91.7 | 1.3 | 231.6 | 0.8 |

Fig. 5F

| Similarity | Video-362 | Video-363 | Video-364 | Video-365 | Video-366 |
|---|---|---|---|---|---|
| Video-357 | 29.7 | 34.6 | 11.1 | 37.5 | 38.4 |
| Video-358 | 196.1 | 16.0 | 10.1 | 14.2 | 11.2 |
| Video-359 | 4.3 | 3.0 | 3.8 | 9.0 | 1.7 |
| Video-360 | 250.9 | 132.8 | 3.5 | 122.3 | 1.6 |
| Video-361 | 3.0 | 1.6 | 0.8 | 1.5 | 1.0 |
| Video-362 | 0.0 | 47.5 | 3.6 | 9.9 | 3.4 |
| Video-363 | 47.5 | 0.0 | 3.4 | 7.8 | 3.1 |
| Video-364 | 3.6 | 3.4 | 0.0 | 3.5 | 3.3 |
| Video-365 | 9.9 | 7.8 | 3.5 | 0.0 | 8.0 |
| Video-366 | 3.4 | 3.1 | 3.3 | 8.0 | 0.0 |
| Video-367 | 56.7 | 13.2 | 3.7 | 7.4 | 1.8 |
| Video-368 | 3.1 | 2.8 | 3.3 | 3.2 | 3.2 |
| Video-369 | 8.4 | 7.5 | 8.8 | 7.5 | 8.5 |
| Video-370 | 0.4 | 1.8 | 0.9 | 1.8 | 1.4 |
| Video-371 | 2.5 | 2.3 | 3.8 | 2.7 | 1.9 |
| Video-372 | 202.9 | 91.9 | 3.1 | 7.0 | 1.6 |
| Video-373 | 32.6 | 78.9 | 3.6 | 78.3 | 79.1 |
| Video-374 | 0.3 | 1.8 | 0.9 | 1.8 | 1.4 |
| Video-375 | 94.4 | 13.2 | 3.6 | 8.4 | 1.7 |
| Video-376 | 201.6 | 90.1 | 3.1 | 7.1 | 1.5 |

Fig. 5G

| Similarity | Video-367 | Video-368 | Video-369 | Video-370 | Video-371 |
|---|---|---|---|---|---|
| Video-357 | 38.6 | 4.7 | 8.1 | 8.0 | 11.3 |
| Video-358 | 22.1 | 4.8 | 8.6 | 9.0 | 10.6 |
| Video-359 | 0.7 | 3.6 | 9.7 | 0.3 | 2.7 |
| Video-360 | 123.1 | 3.1 | 9.0 | 0.3 | 2.1 |
| Video-361 | 0.4 | 3.5 | 9.1 | 0.2 | 0.8 |
| Video-362 | 56.7 | 3.1 | 8.4 | 0.4 | 2.5 |
| Video-363 | 13.2 | 2.8 | 7.5 | 1.8 | 2.3 |
| Video-364 | 3.7 | 3.3 | 8.8 | 0.9 | 3.8 |
| Video-365 | 7.4 | 3.2 | 7.5 | 1.8 | 2.7 |
| Video-366 | 1.8 | 3.2 | 8.5 | 1.4 | 1.9 |
| Video-367 | 0.0 | 3.4 | 8.9 | 0.5 | 2.4 |
| Video-368 | 3.4 | 0.0 | 6.1 | 3.8 | 3.2 |
| Video-369 | 8.9 | 6.1 | 0.0 | 10.0 | 8.3 |
| Video-370 | 0.5 | 3.8 | 10.0 | 0.0 | 1.7 |
| Video-371 | 2.4 | 3.2 | 8.3 | 1.7 | 0.0 |
| Video-372 | 105.0 | 2.7 | 7.7 | 0.3 | 1.9 |
| Video-373 | 80.3 | 3.4 | 9.2 | 0.6 | 2.5 |
| Video-374 | 0.4 | 3.7 | 9.9 | 0.3 | 1.7 |
| Video-375 | 95.2 | 3.4 | 9.2 | 0.4 | 2.3 |
| Video-376 | 90.4 | 2.7 | 8.2 | 1.1 | 1.9 |

Fig. 5H

| Similarity | Video-372 | Video-373 | Video-374 | Video-375 | Video-376 |
|---|---|---|---|---|---|
| Video-357 | 37.2 | 60.1 | 7.9 | 38.6 | 35.0 |
| Video-358 | 111.4 | 63.4 | 8.9 | 47.0 | 91.7 |
| Video-359 | 2.0 | 80.7 | 0.3 | 0.7 | 1.3 |
| Video-360 | 249.0 | 122.7 | 0.3 | 134.5 | 231.6 |
| Video-361 | 0.3 | 0.4 | 0.2 | 0.3 | 0.8 |
| Video-362 | 202.9 | 32.6 | 0.3 | 94.4 | 201.6 |
| Video-363 | 91.9 | 78.9 | 1.8 | 13.2 | 90.1 |
| Video-364 | 3.1 | 3.6 | 0.9 | 3.6 | 3.1 |
| Video-365 | 7.0 | 78.3 | 1.8 | 8.4 | 7.1 |
| Video-366 | 1.6 | 79.1 | 1.4 | 1.7 | 1.5 |
| Video-367 | 105.0 | 80.3 | 0.4 | 95.2 | 90.4 |
| Video-368 | 2.7 | 3.4 | 3.7 | 3.4 | 2.7 |
| Video-369 | 7.7 | 9.2 | 9.9 | 9.2 | 8.2 |
| Video-370 | 0.3 | 0.6 | 0.3 | 0.4 | 1.1 |
| Video-371 | 1.9 | 2.5 | 1.7 | 2.3 | 1.9 |
| Video-372 | 0.0 | 85.5 | 1.3 | 104.5 | 152.2 |
| Video-373 | 85.5 | 0.0 | 0.6 | 80.1 | 22.6 |
| Video-374 | 1.3 | 0.6 | 0.0 | 0.3 | 0.9 |
| Video-375 | 104.5 | 80.1 | 0.3 | 0.0 | 102.6 |
| Video-376 | 152.2 | 22.6 | 0.9 | 102.6 | 0.0 |

Fig. 5I

SEARCH METHOD FOR VIDEO CLIP

FIELD OF THE INVENTION

The present invention relates generally to a search method, and particularly to a search method for video clip based on the variation of the differences in image characteristics between frames with time.

BACKGROUND OF THE INVENTION

Recently, with the prosperous development of the multimedia industry, a great deal of information is presented and stored in videos. No matter commercial applications, academic researches, or general applications, video information is produced on large scale and hence leading to the needs for storing, processing, and searching.

Current video search technologies mainly include the semantic retrieval and the content based video retrieval. The semantic retrieval is closest to human's natural language and perception. However, it is inherently limited. For example, it requires describing videos using text definitions first in the database. While retrieving, proper keywords should be used for searching. The automation for text definition and keyword selection are still under development. Thereby, its inherent limitations are hard to breakthrough at present.

On the other hand, the content based video retrieval can be further divided to key frame retrieval and frame-by-frame retrieval. The advantage of the key frame retrieval is that the amount of data to be calculated is reduced. Nonetheless, it's difficult to define key frames; the key frames defined by different methods or parameters are not absolutely identical, leading to retrieval error or loss may occur. Thereby, the definition problem has become the bottleneck of the key frame technology. On the other hand, although the frame-by-frame technology can avoid the inconsistency problem encountered on the key frame technology, the amount of calculation is far greater than the latter. Therefore, how to establish a better frame-by-frame sampling model for reducing the amount of data to be calculated effective while maintaining comparing correctness has become the critical point for the frame-by-frame retrieval technology.

Accordingly, the present invention provides an automatic and frame-by-frame search technology for video clip with rapid calculation and accurate comparison. Instead of analyzing and comparing the content of the image in each frame, the present invention calculates rapidly the variation of the differences in image characteristics between frames with time. In addition, the technology according to the present invention is based on the variances of image characteristics between two adjacent frames with time but not on the image characteristics themselves. The distribution curve of the variances of image characteristics with time is unchangeable to image processing such as code conversion, sizing, or hue and brightness adjustments. Thereby, the similarity between videos can be compared effectively. In addition to applying to searching the video matching or partially matching the target video, the present invention can also be applied to filtering redundancy videos and copy detection. Even if the redundancy videos or the illegally copied videos are compressed, code converted, or hue and brightness adjusted, the search method for video clip according to the present invention still can find them effectively.

The technology according to the present invention contains two parts. One is the method for generating the space-time characteristics of a video. The other is to compare videos using the space-time characteristics of the video for retrieving the matched video. The method for generating the space-time characteristics of the video includes the following steps. First, acquire and store a plurality of videos to a storage unit. Each video comprises a plurality of frames, respectively. Then, a processing unit extracts the characteristics of the plurality of frames and gives a plurality of characteristic values. Next, the processing unit calculates a plurality of difference values between the characteristic value of each frame and that of the previous frame and between the characteristic value of the subsequent frame and that of the current frame. Produce a data set by corresponding the plurality of difference values between all frames of each video to the time axis, and store a plurality of data sets corresponding to the plurality of videos to the storage unit, and hence giving the space-time characteristics of the plurality of videos. After the space-time characteristics of videos are generated, the processing unit compares a data set of any video with a plurality of data sets of other videos and gives a search result, respectively. The processing unit calculates a plurality of distances between the data set of the video and the plurality of data sets of the other videos. The smaller the distance is, the more the plurality of videos are similar.

SUMMARY

An objective of the present invention is to provide a method for generating the space-time characteristics of videos. The space-time characteristics is generated by corresponding the differences between the image characteristics of all adjacent frames in each video to the time axis. The space-time characteristics of the video will not alter after code conversion, sizing, and hue and brightness adjusting processes. Thereby, they can be used as the comparison basis for a plurality of videos.

Another objective of the present invention is to provide a search method for video clip. A search result is given by comparing the space-time characteristics of any video with others. Thereby, automatic, frame-by-frame, rapid, and accurate video inquiry can be achieved. It is also suitable for inquiring matched or similar videos as well as filtering redundancy or illegally copied videos.

For achieving the objectives described above, the present invention provides a search method for video clip and a method for generating the space-time characteristics of videos applicable to the search method for video clip. The method comprises the following steps. First, acquire and store a plurality of videos to a storage unit. Each video comprises a plurality of frames, respectively. Then, a processing unit extracts the characteristics of the plurality of frames and gives a plurality of characteristic values. Next, the processing unit calculates a plurality of difference values between the characteristic value of each frame and that of the previous frame and between the characteristic value of the subsequent frame and that of the current frame. Produce a data set by corresponding the plurality of difference values between all frames of each video to the time axis, and store a plurality of data sets corresponding to the plurality of videos to the storage unit, and hence giving the space-time characteristics of the plurality of videos. After the space-time characteristics of videos are generated, the processing unit compares a data set of any video with a plurality of data sets of other videos and gives a search result, respectively. The search can contain at least a video matched with the video.

The step of the processing unit extracting the characteristics of the plurality of frames and giving a plurality of characteristic values can further include that the processing unit samples a plurality of pixels contained in the plurality of frames, gives a plurality of description values, and converts the plurality of description values to the plurality of characteristic values. The description values can be a plurality of RGB value, a plurality of RGBA values, a plurality of HSV values, a plurality of HSI values, a plurality of YUV values, a plurality of brightness values, or a plurality of grayscale values. The plurality of RGB values represent the composition ratio of the three primary colors for the plurality of pixels. In addition to the composition ratio of the three primary colors for the plurality of pixels, the Alpha value in the plurality of RGBA values can further represents the transparency of colors for the plurality of pixels. The plurality of HSV values represent the hue, saturation, and value of the plurality of pixels. The plurality of HSI values represent the hue, saturation, and intensity of the plurality of pixels. The plurality of YUV values represent the luminance and chrominance of the plurality of pixels. The plurality of description values can be a single value or a composite value. For example, the plurality of brightness values or the plurality of grayscale values are single values; the plurality of RGB values, HSV values, and YUV values are composite values with three values each; and the plurality of RGBA values are composite values with four values each. Thereby, the selection of the plurality of description values will influence the execution speed of the search method for video clip according to the present invention. The more values a composite value has, the slower the operational speed will be. Besides, the operating speed for a single value is faster than for a composite value and thus leading to better performance. Moreover, the plurality of characteristic values can be a plurality of arithmetic means, a plurality of geometric means, a plurality of matrices, a plurality of histograms, or other sets. During the process of extracting the description values and the characteristic values, most image information will be omitted and only a few portion of the image information is reserved. The image information reserved in the plurality of histograms is more than that reserved in the plurality of geometric means. In addition, generally, the image information reserved in the plurality of geometric means is more than that reserved in the plurality of arithmetic means.

If a characteristic curve along the time axis is produced using the plurality of characteristic values of the plurality of frames directly and used as the comparison basis for searching matched or similar videos, the characteristic curve and the comparison result tend to be influenced by video variance. For example, when the video is adjusted brighter or darker, changed in hue, sized, or code converted, the plurality of characteristic values of the plurality of frames are destroyed. Hence, it's difficult to search or trace similar videos. Accordingly, the plurality of characteristic values are converted to the plurality of difference values. By calculating the difference between the image characteristic values of two adjacent frames, the influence of image variance on video comparison is reduced. The plurality of difference values represent the difference between the characteristic values of any two adjacent frames on the time axis. The plurality of difference values can be calculated by selecting different functions and become a plurality of chi-square values, a plurality of PSNR values, a plurality of RMSE values, a plurality of UQI values, a plurality of VQM values, a plurality of PEVQ values, a plurality of SSIM values, a plurality of DC+M values, or a plurality of motion vector values. The plurality of chi-squire values and the plurality of MSRE values apply statistical methods to image processing for representing the difference between the characteristic values of two images. In particular, the selection the plurality of chi-square values is an innovative method. The plurality of SSIM values, the plurality of DC+M values, and the plurality of motion vector values can also represent the difference between the characteristic values of two images. The plurality of UQI values, the plurality of VQM values, and the plurality of PEVQ values represent the difference between the qualities of two images. Thereby, they can be interchangeably used for generating the plurality of data sets in the search method for video clip according to the present invention.

The plurality of data sets can be expressed as a plurality of space-time characteristic curves. The processing unit compares a data set of any video in the assigned target with the plurality of data sets of the plurality of other videos. The step of giving a search result can further comprise the step that the processing unit a plurality of distances between the data set of the video and the plurality of data sets of the plurality of other videos. The plurality of distances can be calculated by selecting different distance functions, including a plurality of Euclidean distances, a plurality of Mahalanobis distances, or a plurality of Hausdorff distances. The plurality of distances represent the difference between two data sets or between space-time characteristic curves. If the distance is smaller, it means that the difference between two data sets or between space-time characteristic curves is smaller and the two videos corresponding to the two data sets are more matched or similar. Thereby, the methods for calculating distances in mathematics are applicable to comparing the plurality of data sets according to the present invention. Furthermore, a judging standard can be set. The search result can display the plurality of videos with the plurality of distances less than the judging standard. The videos can be arranged progressively from the one with the smallest distance for providing the search result with the most matched or similar videos first.

BRIEF DESCRIPTION OF THE DRAWINGS

FIGS. 5A-5J show practical operating results according to the first embodiment of the present invention.

DETAILED DESCRIPTION

In order to make the structure and characteristics as well as the effectiveness of the present invention to be further understood and recognized, the detailed description of the present invention is provided as follows along with embodiments and accompanying figures.

The feature of the search method for video clip according to the present invention is that a data set is given by corresponding the differences of the image characteristics between all adjacent frames in each video to the time axis and used as the space-time characteristics of the video. The data set is further used as the comparison basis for video inquiry. The data set is not easily influenced by sizing, code conversion, or hue and brightness adjustment of the video. It can also simplify video comparing while achieving quite accurate matching performance. Thereby, the present invention can provide an automatic, frame-by-frame, rapid, and accurate search method for video clip. It can also be applied to retrieving general videos, filtering redundant videos, and copy detection.

Figure 1:
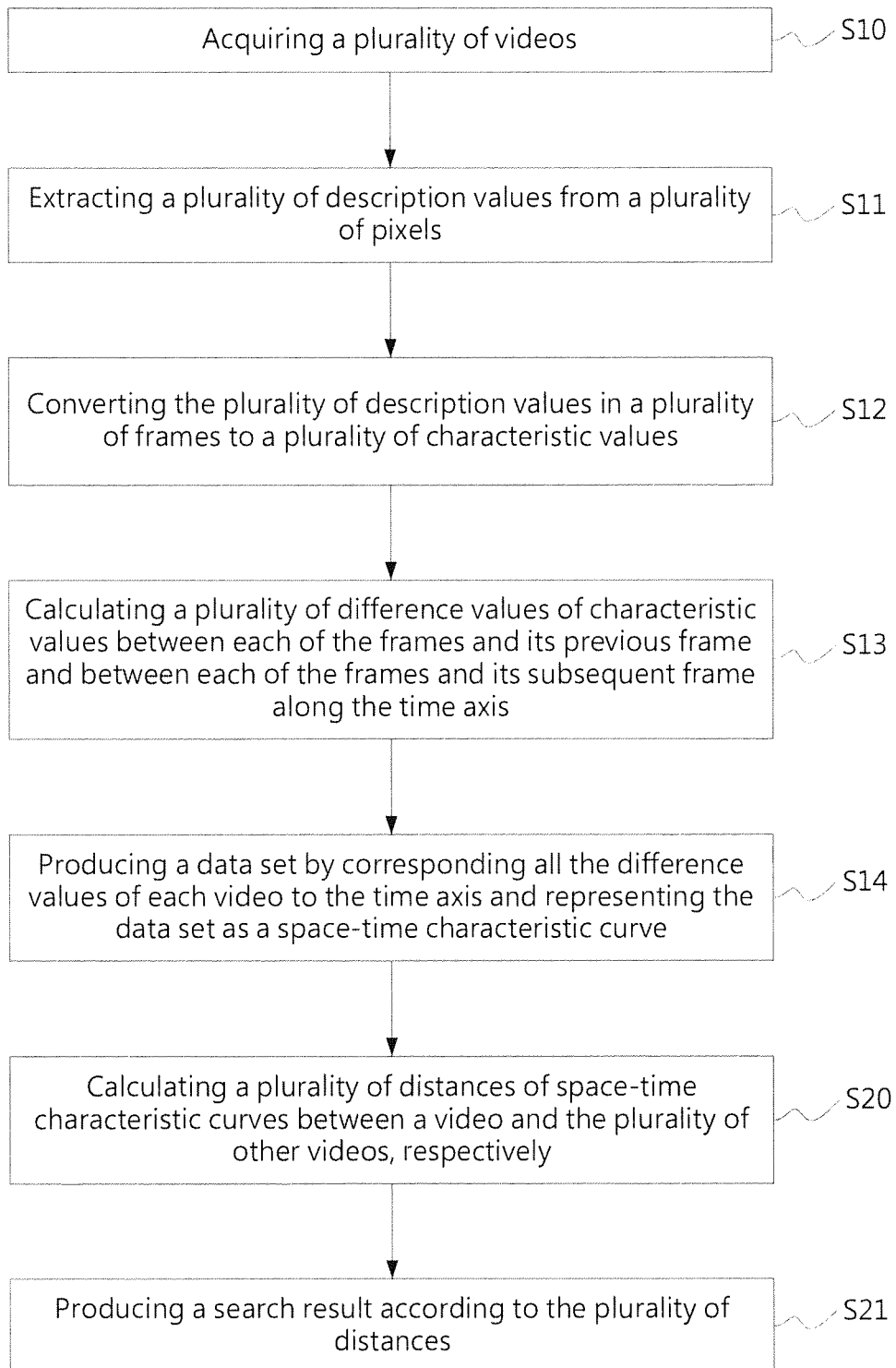
FIG. 1 shows the overall flowchart of the present invention.

FIG. 1 shows the overall flowchart of the present invention. As shown in the figure, the present invention provides a search method for video clip, which comprises the following steps:

Step S10: Acquiring a plurality of videos;

Step S11: Extracting a plurality of description values from a plurality of pixels;

Step S12: Converting the plurality of description values in a plurality of frames to a plurality of characteristic values;

Step S13: Calculating a plurality of difference values of characteristic values between each of the frames and its previous frame and between each of the frames and its subsequent frame along the time axis;

Step S14: Producing a data set by corresponding all the difference values of each video to the time axis and representing the data set as a space-time characteristic curve;

Step S20: Calculating a plurality of distances of space-time characteristic curves between a video and the plurality of other videos, respectively; and Step S21: Producing a search result according to the plurality of distances.

The present procedure uses a video as the target and searches the video matching or similar to the target video from the plurality of other videos. The steps S10 to S14 are the steps for producing the plurality of space-time characteristics of the plurality of videos; the steps S20 to S21 are the steps for comparing the difference of space-time characteristic between the target video and the plurality of other videos.

In the step S10, a plurality of videos are acquired and stored in a storage unit. Each video has a plurality of frames; each frame has a plurality of pixels. Then the step S11 is executed. A processing unit extracts a plurality of description values from the plurality of pixels in each frame of the plurality of videos. The description values can be a plurality of RGB value, a plurality of RGBA values, a plurality of HSV values, a plurality of HSI values, a plurality of YUV values, a plurality of brightness values, or a plurality of grayscale values for describing the properties of the plurality of pixels. In the step S12, the plurality of description values are converted to a plurality of characteristic values, which can be a plurality of arithmetic means, a plurality of geometric means, a plurality of matrices, a plurality of histograms, or a plurality of other sets. By means of the processes of extracting the plurality of description values and converting the plurality of characteristic values, the plurality of characteristic values can represent the image characteristics of the plurality of frames, respectively. Compared with the originally complete plurality of frames, the plurality of characteristic values given by the plurality of frames only need very small storage space. Afterwards, the processing unit executes the step S13 for calculating a plurality of difference values of characteristic values between each of the frames and its previous frame and between each of the frames and its subsequent frame along the time axis. The plurality of difference values can be a plurality of chi-square values, a plurality of PSNR values, a plurality of RMSE values, a plurality of UQI values, a plurality of VQM values, a plurality of PEVQ values, a plurality of SSIM values, a plurality of DC+M values, or a plurality of motion vector values. Then, in the step S14, produce a data set by corresponding all the difference values of each video to the time axis and store the data set to the storage space. The data set is the space-time characteristic of the video and is represented as a space-time characteristic curve.

In the step S20, select a video from the plurality of videos as the search target and calculate a plurality of distances of space-time characteristic curves between the video and the plurality of other videos, respectively. The plurality of distances can be a plurality of Euclidean distances, a plurality of Mahalanobis distances, or a plurality of Hausdorff distances.

The plurality of distances can be used for judging the similarity between the space-time characteristic curve and the plurality of other space-time characteristic values. The smaller the plurality of distances are, the more the videos are matched or similar. Then the step S21 is executed for giving the search result. Furthermore, a judging standard can be set. The search result contains the plurality of videos with the plurality of distances less than the judging standard. The videos can be arranged progressively from the one with the smallest distance for providing the search result with the most matched or similar videos first.

By executing the steps S10 to S21, the present invention can produce a data set by corresponding the differences of characteristic values between a plurality of frames contained in a plurality of videos, respectively to the time axis and use the data set as the space-time characteristics of the plurality of videos and the basis for inquiring and comparing the videos.

Figure 2:
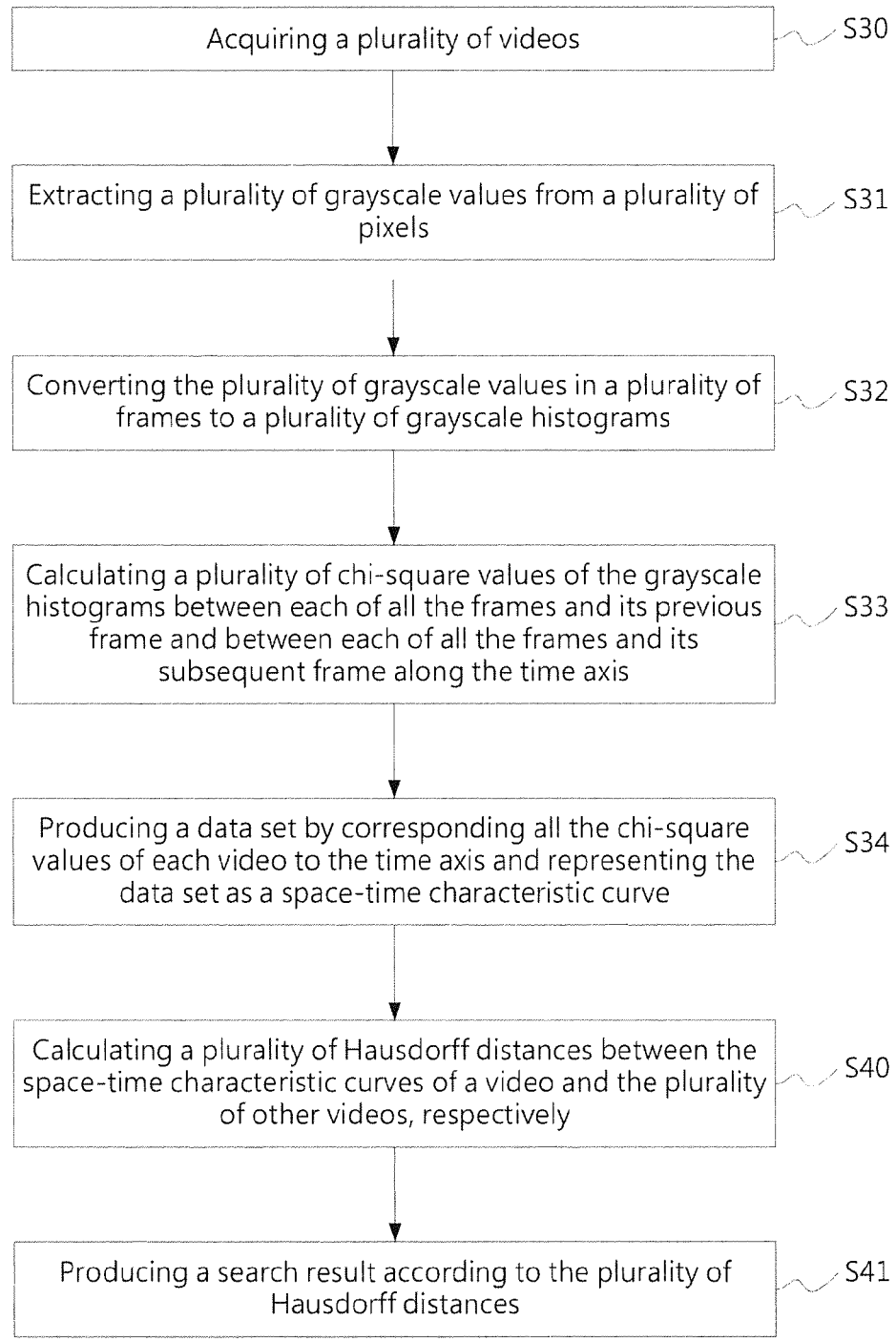
FIG. 2 shows a flowchart according to the first embodiment of the present invention.

FIG. 2 shows a flowchart according to the first embodiment of the present invention. As shown in the figure, the first embodiment of the search method for video clip according to the present invention comprises the following steps:

Step S30: Acquiring a plurality of videos;

Step S31: Extracting a plurality of grayscale values from a plurality of pixels;

Step S32: Converting the plurality of grayscale values in a plurality of frames to a plurality of grayscale histograms;

Step S33: Calculating a plurality of chi-square values of the grayscale histograms between each of all the frames and its previous frame and between each of all the frames and its subsequent frame along the time axis;

Step S34: Producing a data set by corresponding all the chi-square values of each video to the time axis and representing the data set as a space-time characteristic curve;

Step S40: Calculating a plurality of Hausdorff distances between the space-time characteristic curves of a video and the plurality of other videos, respectively; and Step S41: Producing a search result according to the plurality of Hausdorff distances.

Figure 3:
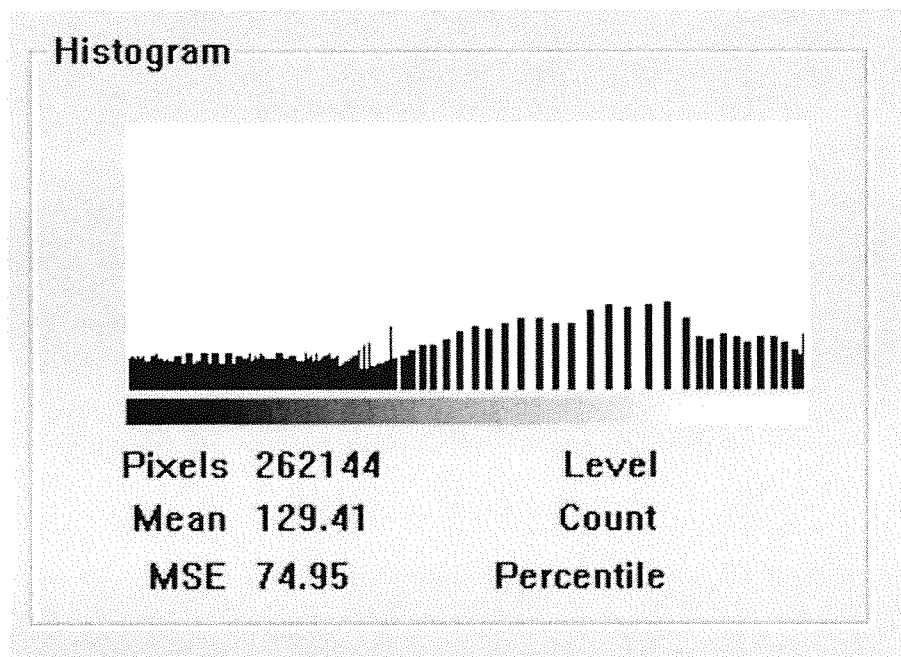
FIG. 3 shows a schematic diagram of grayscale histogram.

According to the present embodiment, a grayscale value is extracted form each pixel contained in each frame of each video. The plurality of grayscale values of the plurality of pixels contained in each frame are converted to a grayscale histogram, as shown in FIG. 3. The horizontal axis of the grayscale histogram represents the grayscale values ranging from 0 to 255; the vertical axis represents the number of pixels. The bar corresponding to each grayscale value represents the number of pixels with grayscale values equal to that value in the frame. Besides, the chi-square values of the grayscale histogram between adjacent frames are calculated for representing the distribution difference in the plurality of grayscale histograms for the plurality of grayscale values of the plurality of pixels of adjacent frames. The equation for calculating the chi-square value is:

$$X^2 = \Sigma(R_i - S_i)^2/(R_i + S_i)$$

where i represents 256 grayscale values ranging from 0 to 255; $R_i$ represents the number of pixels with grayscale value i in the frame with earlier time for two adjacent frames; $S_i$ represents the number of pixels with grayscale value i in the frame with later time for two adjacent frames. Thereby, $(R_i - S_i)^2/(R_i + S_i)$ can represent the variation in the number of pixels with grayscale value i for the two frames. By summing $(R_i - S_i)^2/(R_i + S_i)$ from i equal to 0 to 255, a chi-square value $X^2$ is given. The chi-square value can represent the variation in the number of pixels for all grayscale values.

Figure 4:
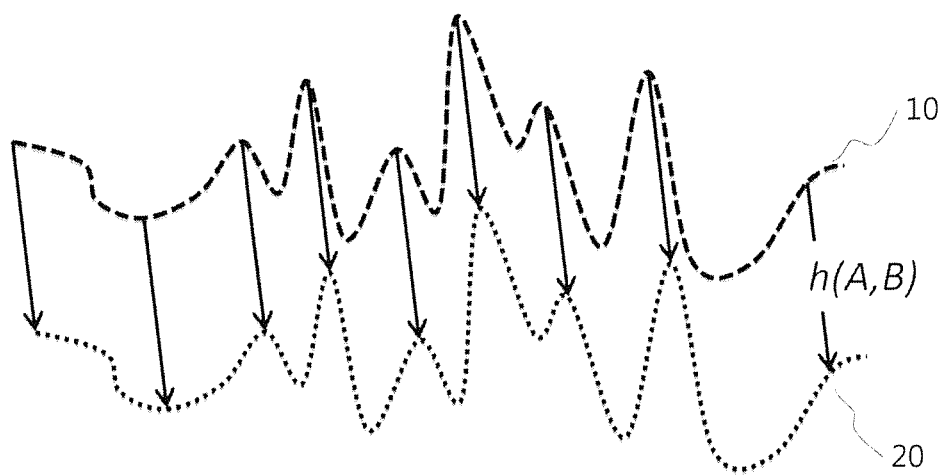
FIG. 4 shows a schematic diagram of the Hausdorff distance between two space-time characteristic curves.

After the chi-square value for adjacent frames is calculated, a data set can be given by corresponding all the chi-square values of a video to the time axis. The data set can be expressed as a space-time characteristic curve for comparing the distance of data sets between any two videos. According to the present embodiment, a Hausdorff distance of any two space-time characteristic curves is calculated. As shown in FIG. 4, according to the a first space-time characteristic curve 10 and a second space-time characteristic curve 20, the distance h(A,B) between any point A on the first space-time characteristic curve 10 and any point B on the second space-time characteristic curve 20 can be calculated.

The equation for calculating the Hausdorff distance is:

$$H(A,B)=\max(h(A,B),h(B,A))$$

where $h(A,B)=\max_{a \in A}\min_{b \in B}\|a-b\|\sim$, and h(A,B) is the maximum distance from A to B, while h(B,A) is the maximum distance from B to A. Usually, h(A,B) and h(B,A) are not equal. Nonetheless, each chi-square value point has been arranged in order according to the time axis while building the space-time characteristic curves, the maximum distance from A to B is equal to the maximum distance from B to A. Thereby, in the present invention, it is not necessary to calculate h(B,A) and thus saving the time the processing unit compares videos.

After calculating the plurality of Hausdorff distances between a target video and the plurality of other videos, respectively, the video corresponding to the minimum Hausdorff distance is just the video most matched video with the target video.

Figure 5A:
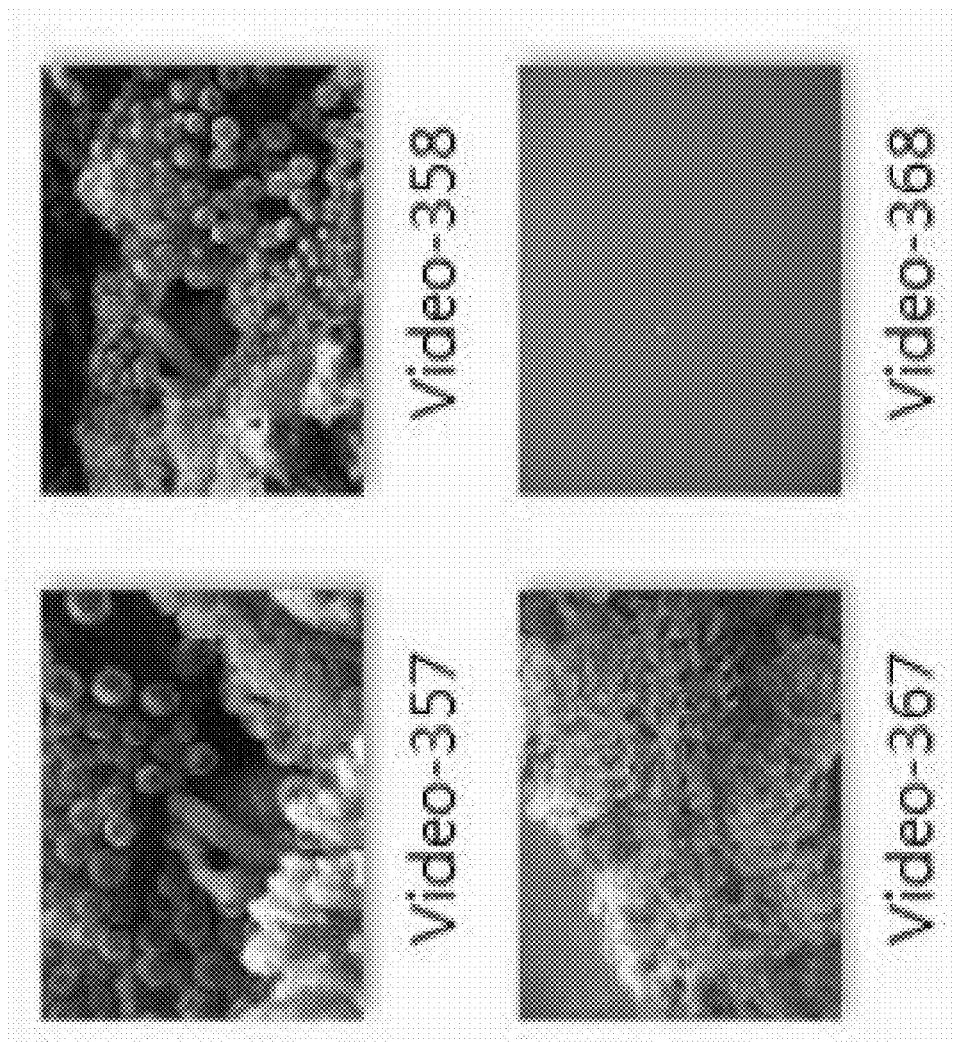
Figure 5B:
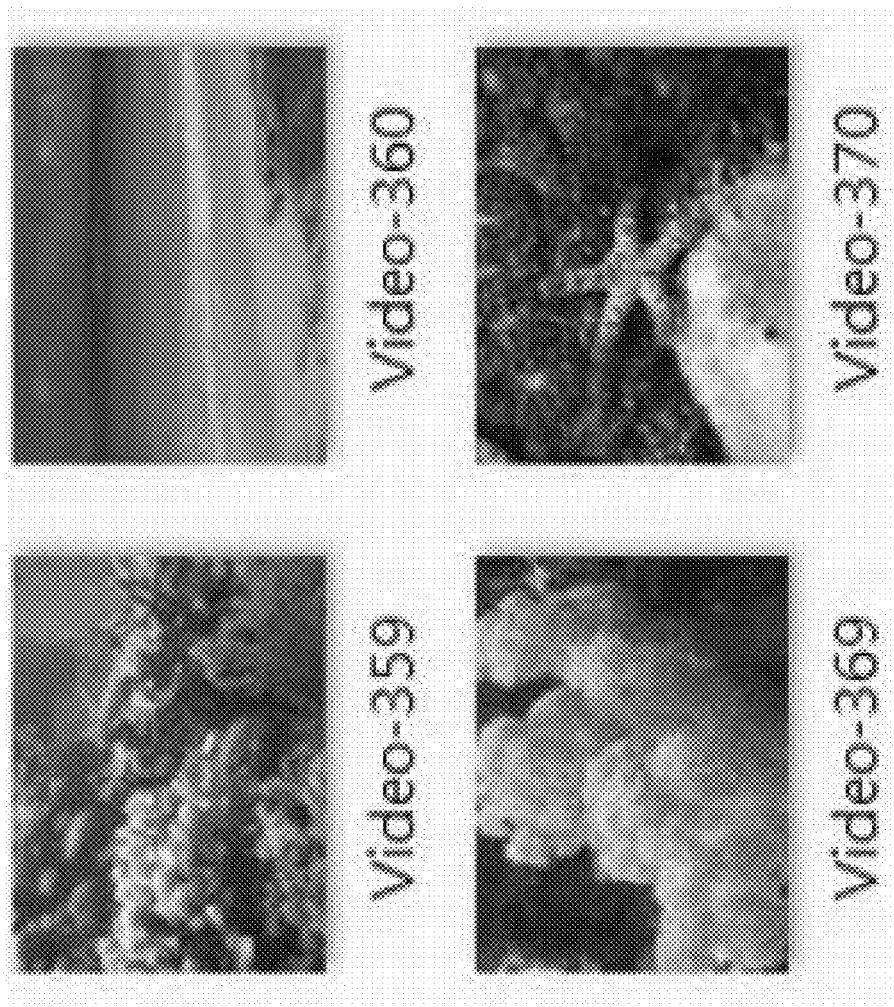
Figure 5C:
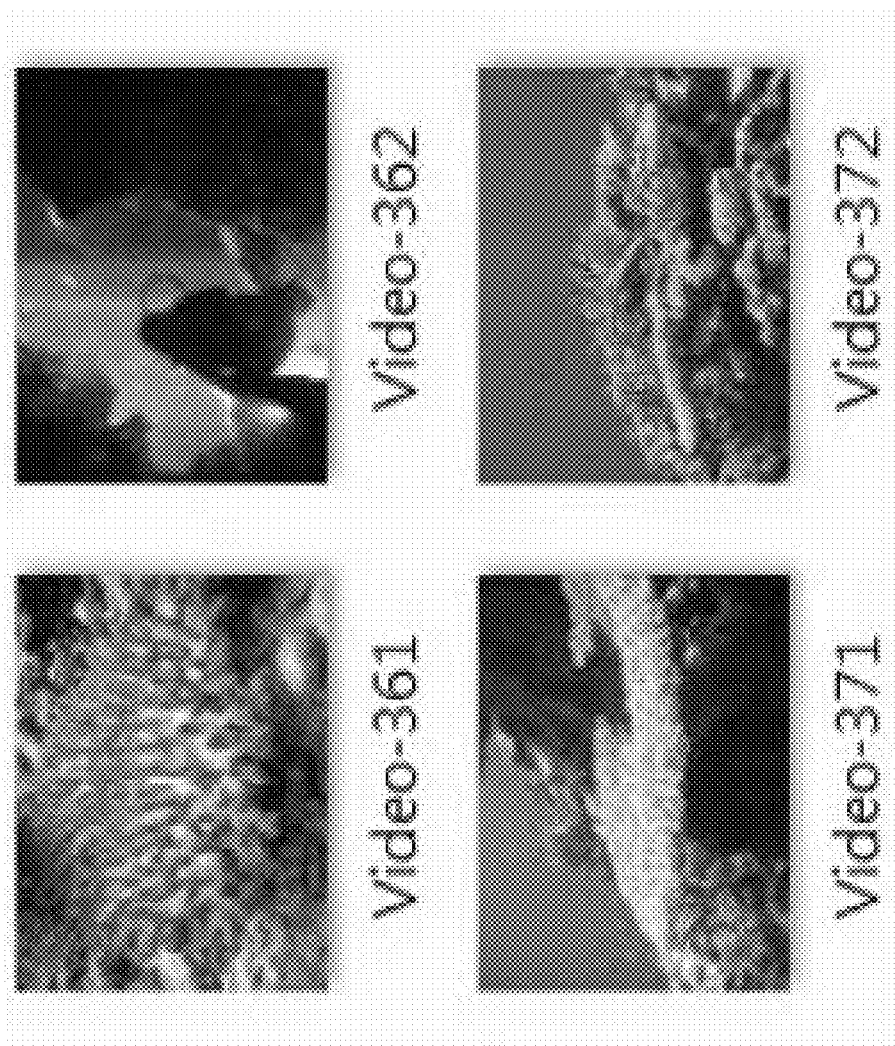
Figure 5D:
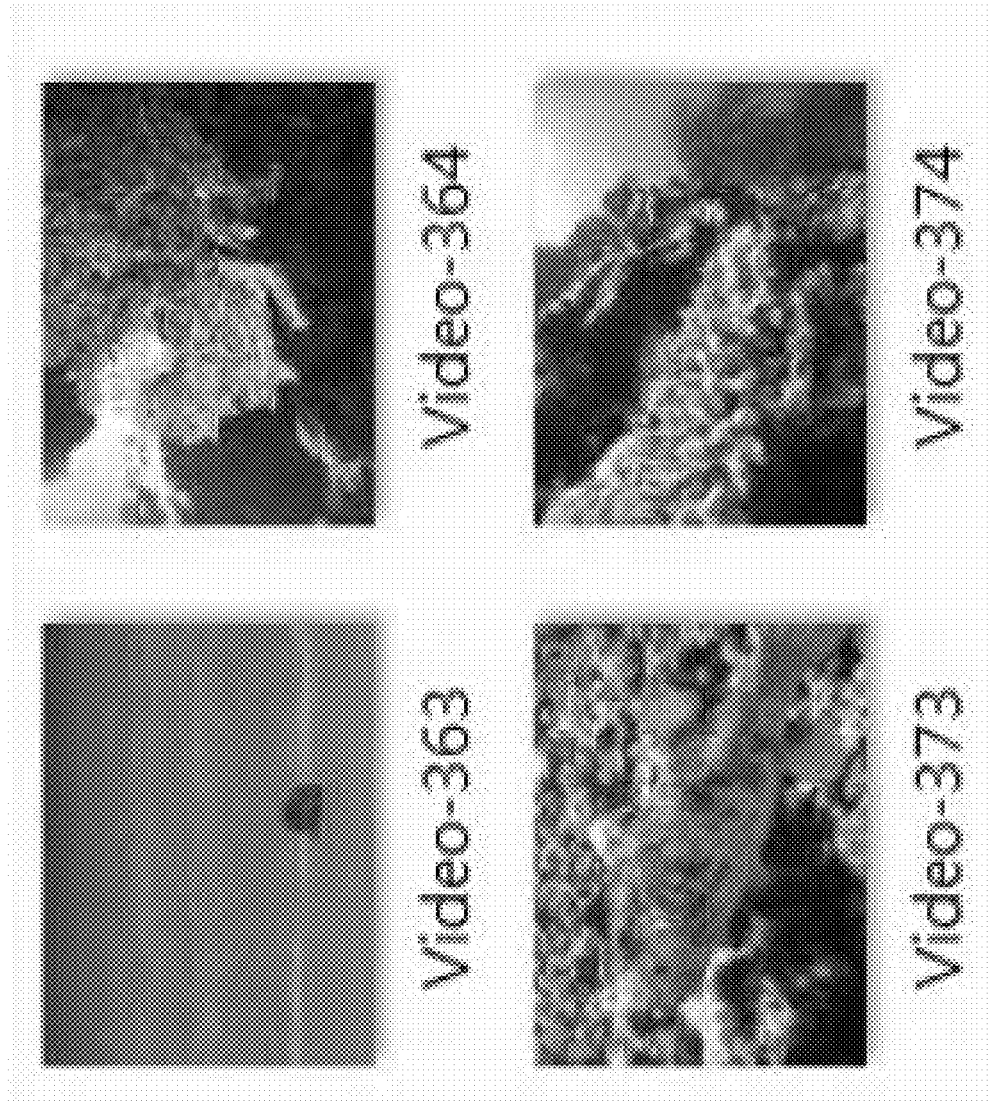
Figure 5E:
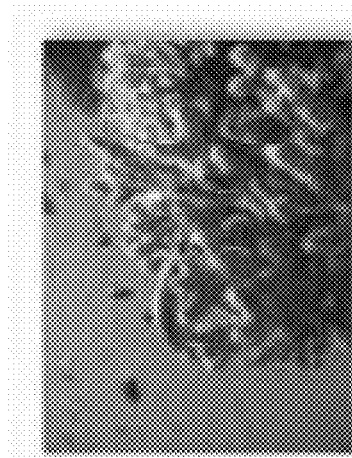
Figure 5E:
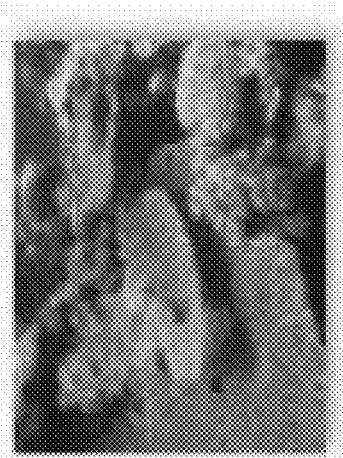
Figure 5E:
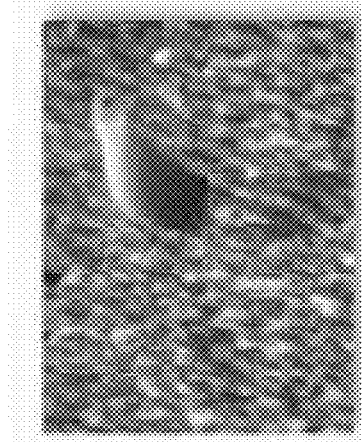
Figure 5E:
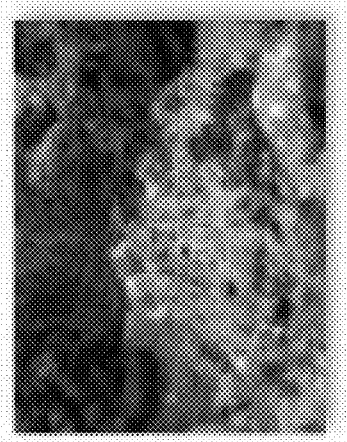
Figure 5J:
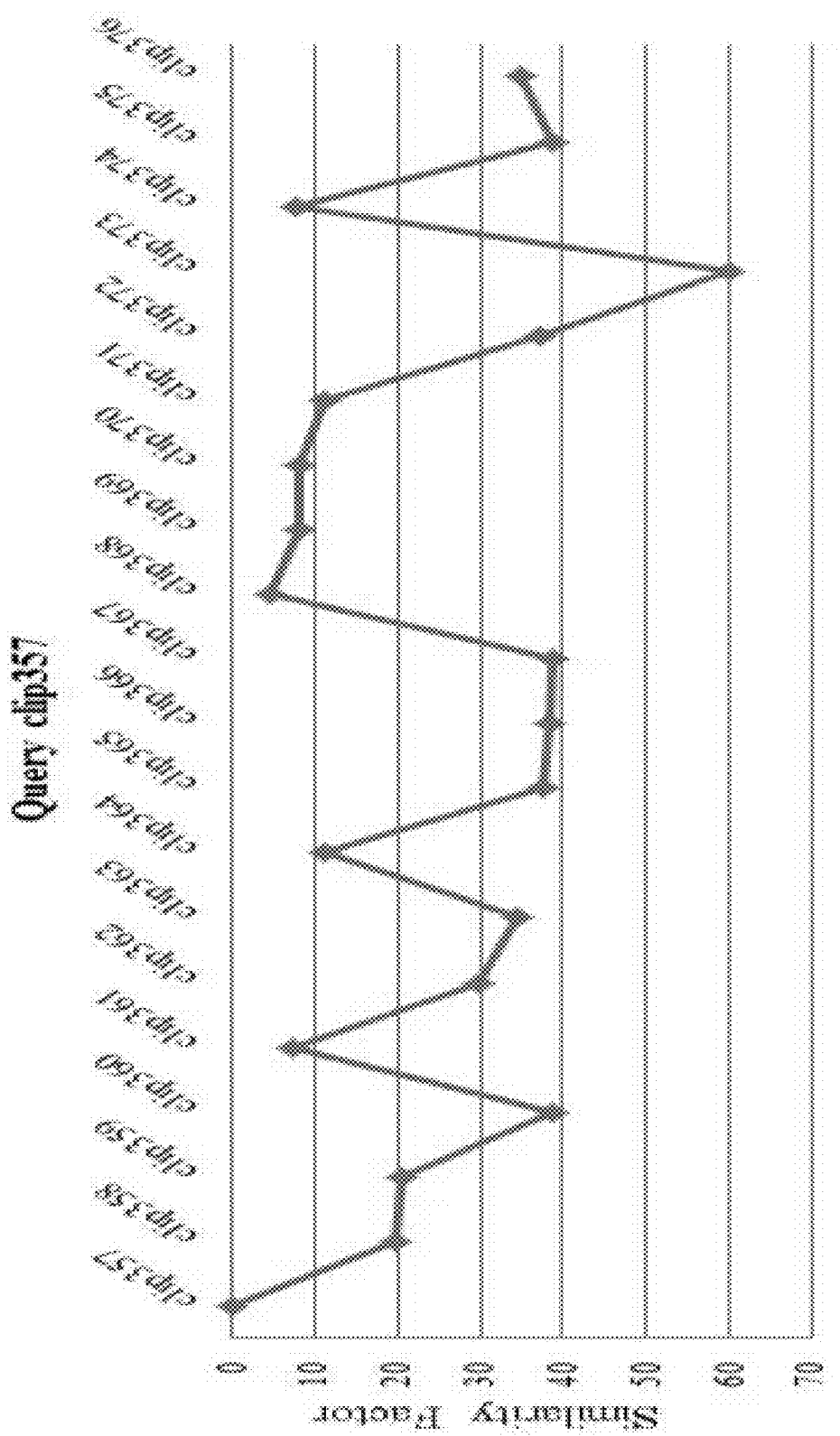

Please refer to FIGS. 5A-5J, which shows a practical operating result according to the first embodiment of the present invention. FIGS. 5A-5E show 20 different videos used in the present operation. The videos are free reef video database from http://www.reefvid.org/ and taken from the Lifou Island, Melanesia, New Caledonia. The numbers listed in FIGS. 5F-5I are the Hausdorff distances between the space-time characteristic curves of each video. According to the numbers, the same video gives zero Hausdorff distance; if two videos are more similar, the Hausdorff distance is smaller. FIG. 5J uses the Video-357 as an example; the line chart shows the Hausdorff distances between the video and all of the 20 videos, including itself. As shown in the figure, except the Video-357 itself, the video most similar to it is the Video-368. According to the practical operating result, it is known that searching a video from a plurality of videos gives 100% accuracy. In other words, even if the subjects and frames may look very similar, only completely identical videos can give the Hausdorff distance of zero.

To sum up, the present invention relates to a search method for video clip. The method comprises the following steps. First, acquire and store a plurality of videos to a storage unit. Each video comprises a plurality of frames, respectively. Then, a processing unit extracts the characteristics of the plurality of frames and gives a plurality of characteristic values. Next, the processing unit calculates a plurality of difference values between the characteristic value of each frame and that of the previous frame and between the characteristic value of the subsequent frame and that of the current frame. Store a data set, which is produced by corresponding the plurality of difference values between all frames of each video to the time axis, to the storage unit. Finally, the processing unit compares a data set of any video with a plurality of data sets of other videos and gives a search result. The present invention can provide an automatic, frame-by-frame, rapid, and accurate search method for video clip. It can also be applied to retrieving general videos, filtering redundant videos, and copy detection.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A search method for video clip, comprising steps of:
acquiring a plurality of videos, each video having a plurality of frames, and storing said plurality of videos in a storage unit;
a processing unit extracting characteristics from said plurality of frames, and giving a plurality of characteristic values;
said processing unit calculating a plurality of difference values of characteristic values between each frame and its previous frame and between each frame and its subsequent frame, respectively, producing a data set by corresponding said plurality of difference values between all said frames of each video to the time axis, storing a plurality of data sets corresponding to said plurality of videos in said storage unit; and
said processing unit comparing a data set of any said video with said plurality of data sets of said plurality of other videos, respectively, and giving a search result.

2. The search method for video clip of claim 1, wherein said step of said processing unit extracting characteristics from said plurality of frames and giving said plurality characteristic values further comprise a step of said processing unit sampling a plurality of pixels contained in said plurality of frames, respectively, giving a plurality of description values, and converting said plurality of description values to said plurality of characteristic values.

3. The search method for video clip of claim 2, wherein said plurality of description values are a plurality of RGB value, a plurality of RGBA values, a plurality of HSV values, a plurality of HSI values, a plurality of YUV values, a plurality of brightness values, or a plurality of grayscale values.

4. The search method for video clip of claim 1, wherein said plurality of characteristic values are a plurality of arithmetic means, a plurality of geometric means, a plurality of matrices, or a plurality of histograms.

5. The search method for video clip of claim 1, wherein said plurality of difference values are a plurality of chi-square values, a plurality of PSNR values, a plurality of RMSE values, a plurality of UQI values, a plurality of VQM values, a plurality of PEVQ values, a plurality of SSIM values, a plurality of DC+M values, or a plurality of motion vector values.

6. The search method for video clip of claim 1, wherein said data set represents a space-time characteristic curve.

7. The search method for video clip of claim 1, wherein said step of said processing unit comparing a data set of any said video with said plurality of data sets of said plurality of other videos, respectively and giving said search result further comprises a step of said processing unit a plurality of distances between said data set of said video and said plurality of data sets of said plurality of other videos, respectively.

8. The search method for video clip of claim 7, wherein said search result includes a plurality of videos with said plurality of distances smaller than a judging standard.

9. The search method for video clip of claim 7, wherein said plurality of distances are a plurality of Euclidean distance, a plurality of Mahalanobis distances, or a plurality of Hausdorff distances.

10. The search method for video clip of claim 3, 4, 5, or 9, wherein said plurality of description values are a plurality of grayscale values, said plurality of characteristic values are a plurality of grayscale histograms, said plurality of difference values are a plurality of chi-square values, and said plurality of distances are a plurality of Hausdorff distances.

11. A search method for video clip, comprising steps of:
acquiring a plurality of videos, each video having a plurality of frames, and storing said plurality of videos in a storage unit;
a processing unit extracting characteristics from said plurality of frames, and giving a plurality characteristic values; and
said processing unit calculating a plurality of difference values of characteristic values between each frame and its previous frame and between each frame and its subsequent frame, respectively, producing a data set by corresponding said plurality of difference values between all said frames of each video to the time axis, storing a plurality of data sets corresponding to said plurality of videos in said storage unit.

12. The search method for video clip of claim 11, wherein said step of said processing unit extracting characteristics from said plurality of frames and giving said plurality characteristic values further comprise a step of said processing unit sampling a plurality of pixels contained in said plurality of frames, respectively, giving a plurality of description values, and converting said plurality of description values to said plurality of characteristic values.

13. The search method for video clip of claim 12, wherein said plurality of description values are a plurality of RGB value, a plurality of RGBA values, a plurality of HSV values, a plurality of HSI values, a plurality of YUV values, a plurality of brightness values, or a plurality of grayscale values.

14. The search method for video clip of claim 11, wherein said plurality of characteristic values are a plurality of arithmetic means, a plurality of geometric means, a plurality of matrices, or a plurality of histograms.

15. The search method for video clip of claim 11, wherein said plurality of difference values are a plurality of chi-square values, a plurality of PSNR values, a plurality of RMSE values, a plurality of UQI values, a plurality of VQM values, a plurality of PEVQ values, a plurality of SSIM values, a plurality of DC+M values, or a plurality of motion vector values.

16. The search method for video clip of claim 11, wherein said data set represents a space-time characteristic curve.

17. The search method for video clip of claim 13, 14, or 15, wherein said plurality of description values are a plurality of grayscale values, said plurality of characteristic values are a plurality of grayscale histograms, and said plurality of difference values are a plurality of chi-square values.

* * * * *